(12) United States Patent
Nugent

(10) Patent No.: US 9,085,496 B2
(45) Date of Patent: Jul. 21, 2015

(54) ORGANIC COMPOSITION FOR USE WITH PLANTS

(71) Applicant: The Dirt Merchant, Inc., Bensalem, PA (US)

(72) Inventor: Michael R. Nugent, Bensalem, PA (US)

(73) Assignee: The Dirt Merchant, Inc., Newtown, PA (US)

( * ) Notice: Subject to any disclaimer, the term of this patent is extended or adjusted under 35 U.S.C. 154(b) by 0 days.

(21) Appl. No.: 14/364,835

(22) PCT Filed: Sep. 3, 2013

(86) PCT No.: PCT/US2013/057876
§ 371 (c)(1),
(2) Date: Jun. 12, 2014

(87) PCT Pub. No.: WO2015/034470
PCT Pub. Date: Mar. 12, 2015

(65) Prior Publication Data
US 2015/0065344 A1 Mar. 5, 2015

(51) Int. Cl.
*C05F 11/08* (2006.01)
*C05F 5/00* (2006.01)
*C05G 3/04* (2006.01)
*C05G 3/02* (2006.01)

(52) U.S. Cl.
CPC ... *C05G 3/04* (2013.01); *C05F 5/00* (2013.01); *C05F 11/08* (2013.01); *C05G 3/02* (2013.01)

(58) Field of Classification Search
None
See application file for complete search history.

(56) References Cited

U.S. PATENT DOCUMENTS

| 2,049,524 A * | 8/1936 | Stillwell | 71/26 |
|---|---|---|---|
| 2,049,525 A * | 8/1936 | Stillwell | 71/26 |
| 3,163,517 A | 12/1964 | May et al. | |
| 3,337,326 A | 8/1967 | May et al. | |
| 3,776,528 A | 12/1973 | Toto | |
| 4,081,366 A * | 3/1978 | O'Donnell | 210/725 |
| 5,368,626 A | 11/1994 | Schnuda | |
| 5,441,877 A | 8/1995 | Chiaffredo et al. | |
| 5,720,793 A * | 2/1998 | Kato et al. | 71/16 |
| 5,803,664 A | 9/1998 | Kawabata et al. | |
| 5,900,038 A * | 5/1999 | Wilhelm et al. | 71/23 |
| 6,254,654 B1 | 7/2001 | Van Barneveld | |
| 7,867,947 B1 | 1/2011 | Devic et al. | |
| 7,927,397 B1 * | 4/2011 | Evans | 71/16 |
| 8,236,085 B1 | 8/2012 | Cheiky et al. | |
| 8,261,487 B2 | 9/2012 | Harder | |
| 8,568,758 B2 * | 10/2013 | Daniels | 424/406 |
| 2003/0089035 A1 | 5/2003 | Courtemanchie | |
| 2004/0089042 A1 * | 5/2004 | Henderson | 71/21 |
| 2008/0184753 A1 * | 8/2008 | Evans | 71/23 |
| 2008/0280760 A1 * | 11/2008 | Oliver | 504/101 |
| 2012/0144888 A1 * | 6/2012 | Zhang | 71/23 |
| 2012/0247164 A1 * | 10/2012 | Dahms et al. | 71/8 |

FOREIGN PATENT DOCUMENTS

| AU | 2007209830 | * | 3/2008 |
| CN | 1238321 A | | 12/1999 |
| EP | 2096094 | * | 9/2009 |
| EP | 1453374 B1 | | 2/2011 |
| RU | 2115638 | * | 7/1998 |
| WO | WO-2007140521 A1 | | 12/2007 |

* cited by examiner

*Primary Examiner* — Wayne Langel
(74) *Attorney, Agent, or Firm* — Michael Crilly, Esquire

(57) ABSTRACT

An organic composition for use as ground covering capable of supporting plant life is presented. The organic composition is a mixture of filtration waste and topsoil, dirt, manure, wood chips, leaves, and/or sand. The filtration waste further includes carbon, diatomaceous earth, and sugar removed from filtering equipment after the refinement of raw sugar. In some embodiments, the filtration waste promotes the proliferation of organisms which decompose wood chips, leaves, and/or manure. The organic composition is applicable as a material applied within an area at a thickness which allows new plant growth, as an additive onto the surface of an area to promote plate growth, or as a component for mixture with soil as a soil supplement to promote plant growth.

34 Claims, No Drawings

ORGANIC COMPOSITION FOR USE WITH PLANTS

CROSS REFERENCE TO RELATED APPLICATIONS

This application is based upon and claims priority from Patent Cooperation Treaty Application No. PCT/US2013/057876 filed Sep. 3, 2013 entitled Organic Composition for Use with Plants. The subject matter of the prior application is incorporated in its entirety herein by reference thereto.

FEDERALLY SPONSORED RESEARCH AND DEVELOPMENT

None.

BACKGROUND OF THE INVENTION

1. Field of the Invention

The invention generally relates to a composition applicable as a ground covering capable of supporting plant life. Specifically, the invention is an organic composition including a mixture of filtration waste with topsoil, dirt, manure, wood chips, leaves, and/or sand. The filtration waste is a mixture of carbon, diatomaceous earth, and sugar removed from filtering equipment as a waste byproduct after the refinement of raw sugar.

2. Background

Sugar refining is the process whereby high-quality sugars are produced from sugarcane. After sugarcane is harvested, the stalks are crushed to extract juices which are eventually processed into a variety of edible sugars. Bagasse is a fibrous matter that remains after the crushing process. Bagasse is often burned to produce steam that powers the refinery which processes the juices. Bagasse is also used as a composition for conditioning the soil environment around plants to improve the rate and uniformity of plant growth. However, bagasse has a relatively high carbon-to-nitrogen ratio which tends to inhibit plant growth. Therefore, bagasse requires further processing, conditioning, and/or additives to avoid this and other problems associated with its use as a soil supplement.

Sugarcane juices are dried and processed to form a raw sugar, often in the form of a course crystal. The raw sugar is shipped to refineries for processing into a final product, examples including but not limited to granulated sugars, soft brown sugars, and sugar cubes. The raw sugar is affined, melted, clarified, decolorized, and crystallized. Sugar products are dried and packaged for sale.

Affination is the mixing of raw sugar with a warm syrup which removes the molasses coating from the sugar crystals. The syrup and crystals are separated by spinning within a centrifuge, and the crystals are further washed with a water spray. The sugar crystals are then fed into a melter, wherein the crystals are dissolved within hot water to form a liquor. The raw liquor is often clarified via a process which includes either phosphatation or carbonatation.

Phosphatation includes addition of phosphoric acid and lime to the liquor resulting in the formation of calcium phosphate. The liquor is placed in a flotation clarifier which allows the calcium phosphate byproduct to float to the top of the liquor for eventual removal by surface scraping.

Carbonatation includes addition of carbon dioxide gas and lime to the liquor resulting in the formation of calcium carbonate. The liquor is placed in a flotation clarifier which allows the calcium carbonate byproduct to float to the top of the liquor for eventual removal by surface scraping.

It may possible for the calcium phosphate or the calcium carbonate to be filtered from the liquor in addition to or instead of scraping.

The liquor may be decolorized via the addition of carbon adsorbents, examples including but not limited to granular activated carbon and bone charcoal. The liquor is passed through pressure leaf filters which include layers of diatomaceous earth. The filters separate the carbon from the liquor by trapping the carbon within the filters and allowing the liquor to pass through the filters. A portion of the sugar coats or is trapped by the diatomaceous earth, filters, and/or carbon, the latter formed on the filters during filtration. The filters are cleaned to remove the filtration waste, namely, carbon, diatomaceous earth, and sugar.

In other refinement methods, the liquor with or without carbon, is passed through pressure leaf filters which include layers of diatomaceous earth and carbon. The filters separate the carbon, if present, from the liquor by trapping the carbon within the filters and allowing the liquor to pass through the filters. A portion of the sugar coats or is trapped by the diatomaceous earth, filters, and/or carbon. The filters are cleaned to remove the filtration waste, namely, carbon, diatomaceous earth, and sugar.

It is understood that the components of the filtration waste, namely, carbon, diatomaceous earth, and sugar are critical to the present invention. As such, the refinement methodology resulting in the combination of components does not limit the scope of the present invention. Furthermore, the refinement methodologies are in no way limited to the examples provided herein.

Presently, the filtration waste has little or no reuse value and is discarded and often disposed of in a waste disposal site. In view of the deficiencies associated with bagasse as a soil conditioner, it would be highly advantageous if the filtration waste could be used within an organic composition to improve the growth characteristics otherwise achievable with various formulations of topsoil, dirt, manure, wood chips, leaves, and sand.

Therefore, what is required is an organic composition including filtration waste which promotes the growth of plant life whereby the filtration waste is a waste byproduct from the processing of raw sugar.

SUMMARY OF THE INVENTION

An object of the present invention is to provide an organic composition including filtration waste which promotes the growth of plant life whereby the filtration waste is a waste byproduct from the processing of raw sugar.

In accordance with embodiments of the invention, the organic composition includes topsoil, dirt, wood chips, leaves, manure, sand, and filtration waste. The filtration waste further includes carbon, diatomaceous earth, and sugar.

In accordance with other embodiments of the invention, the filtration waste has a total organic content of at least 85% by weight relative to the total weight of the filtration waste.

In accordance with other embodiments of the invention, the organic composition has a total organic content from 5% to 10% by weight relative to the total weight of the organic composition.

In accordance with other embodiments of the invention, the sugar promotes growth of an organism colony within the organic composition that decomposes the wood chips, leaves, and/or manure.

In accordance with other embodiments of the invention, the organic composition includes topsoil in the range from 0.0% to 37.8% by weight, dirt in the range from 0.0% to 71.8% by weight, wood chips in the range from 2.2% to 19.5% by weight, leaves in the range from 0.0% to 2.4% by weight, manure in the range from 0.0% to 17.4% by weight, sand in the range from 0.0% to 10.9% by weight, and filtration waste in the range from 5.1% to 78.0% by weight. Weights are relative to the total weight of the organic composition.

In accordance with other embodiments of the invention, the organic composition includes topsoil at 37.3% by weight, dirt at 37.3% by weight, wood chips at 2.7% by weight, leaves at 1.3% by weight, manure at 5.3% by weight, sand at 10.8% by weight, and filtration waste at 5.3% by weight. Weights are relative to the total weight of the organic composition.

In accordance with other embodiments of the invention, the organic composition includes topsoil, dirt, wood chips, manure, sand, and filtration waste. The filtration waste further includes carbon, diatomaceous earth, and sugar.

In accordance with other embodiments of the invention, the organic composition includes topsoil at 37.8% by weight, dirt at 37.8% by weight, wood chips at 2.7% by weight, manure at 5.4% by weight, sand at 10.9% by weight, and filtration waste at 5.4% by weight. Weights are relative to the total weight of the organic composition.

In accordance with other embodiments of the invention, the organic composition includes dirt, wood chips, leaves, manure, sand, and filtration waste. The filtration waste further includes carbon, diatomaceous earth, and sugar.

In accordance with other embodiments of the invention, the organic composition includes dirt in the range from 60.9% to 71.8% by weight, wood chips in the range from 2.2% to 4.4% by weight, leaves in the range from 0.0% to 2.2% by weight, manure in the range from 8.9% to 17.4% by weight, sand in the range from 8.6% to 10.2% by weight, and filtration waste in the range from 5.1% to 13.3% by weight. Weights are relative to the total weight of the organic composition.

In accordance with other embodiments of the invention, the organic composition includes dirt, wood chips, manure, sand, and filtration waste. The filtration waste further includes carbon, diatomaceous earth, and sugar.

In accordance with other embodiments of the invention, the organic composition includes dirt at 71.8% by weight, wood chips at 2.6% by weight, manure at 10.3% by weight, sand at 10.2% by weight, and filtration waste at 5.1% by weight. Weights are relative to the total weight of the organic composition.

In accordance with other embodiments of the invention, the organic composition includes wood chips, leaves, and filtration waste. The filtration waste further includes carbon, diatomaceous earth, and sugar.

In accordance with other embodiments of the invention, the organic composition includes wood chips at 19.5% by weight, leaves at 2.5% by weight, and filtration waste at 78.0% by weight. Weights are relative to the total weight of the organic composition.

In accordance with other embodiments of the invention, the filtration waste is a byproduct produced during the refinement of sugar.

In accordance with other embodiments of the invention, the filtration waste includes carbon in the range from 19% to 32.7% by weight, diatomaceous earth in the range from 17.3% to 30% by weight, and sugar in the range from 40% to 62% by weight. Weights are relative to the total weight of the filtration waste.

In accordance with other embodiments of the invention, the organic composition includes topsoil, dirt, compostable material, sand, and filtration waste. The compostable material includes wood chips, leaves, or manure. The filtration waste is a waste byproduct of sugar refinement.

In accordance with other embodiments of the invention, the organic composition includes dirt, compostable material, sand, and filtration waste. The compostable material includes wood chips, leaves, or manure. The filtration waste is a waste byproduct of sugar refinement.

In accordance with other embodiments of the invention, the organic composition includes compostable material and filtration waste. The compostable material includes wood chips, leaves, or manure. The filtration waste is a waste byproduct of sugar refinement.

In accordance with embodiments of the invention, the method of producing an organic composition by mixing compostable material and filtration waste, aging the organic composition so that an organism colony decomposes the compostable material, and promoting growth of the organism colony within the compostable material via a sugar. The filtration waste is produced by a sugar refinement process and includes carbon, diatomaceous earth, and sugar.

In accordance with other embodiments of the invention, the mixing step further includes dirt and sand.

In accordance with other embodiments of the invention, the mixing step further includes topsoil, dirt, and sand.

In accordance with other embodiments of the invention, the compostable material is wood chips.

In accordance with other embodiments of the invention, the compostable material is leaves.

In accordance with other embodiments of the invention, the aging step is at least six months duration.

Several advantages are offered by the invention. The invention facilitates reuse of materials otherwise discarded after the refinement of sugar. The invention is applicable as a soil bed for plants or as a soil supplement. The invention is applicable as a ground cover within contamination sites and is believed to remediate some contaminated soils. The sugar within the composition is believed to increase the number of organisms available to decompose the wood chips, leaves, and manure, thus decreasing the time required for decomposition. Some embodiments of the invention are believed to repel certain types of insects. Some embodiments of the invention are believed to resist certain fungi.

DETAILED DESCRIPTION OF THE INVENTION

Reference will now be made in detail to embodiments of the invention. Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

"Topsoil" refers to compositions composed of minerals and organic matter. Minerals many include silt, clay, and/or sand. Organic matter may be live and/or dead. Some compositions of topsoil may further include water and/or gases.

"Dirt" refers to compositions of topsoil with little or no organic matter. Fill dirt is one non-limiting example of dirt which generally refers to a subsoil often found below a topsoil.

"Wood chips" is the plural of wood chip which refers to small-to-medium size material, with or without bark, made by cutting, chipping, or otherwise removing smaller pieces of wood from larger pieces of wood. Exemplary, non-limiting forms of wood chips are mulch and wood pulp. Some compositions of wood chips may be at least partially decomposed, wet, and/or include organisms which decompose wood and other organic matter.

"Leaves" is the plural of leaf which refers to an outgrowth from a plant that is typically a flattened expanded variably shaped organ, constitutes a unit of the foliage, and functions primarily in food manufacture by photosynthesis when chlorophyll is present. Some forms of leaves may be at least partially decomposed, wet, and/or include organisms which decompose leaves and other organic matter. For purposes of the present invention, leaves may also include grass.

"Manure" refers to animal or human dung. Exemplary, non-limiting sources of animal manure are domestic farm animals including cows, horses, sheep, pigs and chickens. Human manure is preferred to be processed or treated to eliminate infectious organisms.

"Sand" refers to granular material composed of finely divided rock and mineral particles. Exemplary, non-limiting constituents of sand are silica, usually in the form of quartz, and calcium carbonate, one non-limiting example being aragonite.

"Compostable material" refers to organic matter capable of being decomposed and/or recycled as a fertilizer and/or soil amendment.

Terms may also be defined with additional language in the remaining portions hereof.

The invention includes organic compositions composed of topsoil, dirt, manure, wood chips, leaves, sand, and filtration waste. The top soil and/or leaves are optional in some embodiments depending on cost, availability, and application of the composition. Dirt, manure, and/or sand are also optional in some embodiments. In preferred embodiments, formulations of the organic composition have a total organic content in the range from 5% to 10% by weight relative to the total weight of the organic composition. However, the total organic content may be more or less depending on the plant life supported by the organic composition. Formulations may be applicable as the top layer or bedding for plants or as a covering or supplement for soil.

In some embodiments, the organic compositions may be composed of wood chips, leaves, and filtration waste. Formulations may be used primarily as ground covering or supplement for soil.

The organic composition may include a variety of formulations whereby the constituents are present in the composition in the proportion of 0.0% to 37.8% topsoil, 0.0% to 71.8% dirt, 2.2% to 19.5% wood, 0.0% to 2.4% leaves, 0.0% to 17.4% manure, 0.0% to 10.9% sand, and 5.1% to 78.0% filtration waste. Weight fractions are relative to the total weight of the organic composition.

The topsoil constituent provides a readily available source of organic materials and organisms. However, topsoil is generally expensive compared to other constituents within the organic composition. A mixture of a dirt constituent and a manure constituent may provide a lower-cost substitute for an organic composition including topsoil only, whereby the manure is a source of organic matter, organisms, nitrogen, and other nutrients beneficial to plant growth. The total weight of manure depends on the organic content and organism load desired within the dirt/manure mixture. For purposes of example only, a dirt-to-manure ratio of approximately 4.67 to 7 may provide an adequate substitute for topsoil, thereby increasing the total mass of topsoil within the composition while minimizing costs. However, other dirt-to-manure ratios are possible depending on the quality and characteristics of the dirt and manure and end use of the organic composition.

In some formulations, it may be possible to replicate the characteristics of the organic composition without the topsoil constituent. For example, the weight of the topsoil otherwise desired may be replaced with an equal quantity of dirt on a weight basis and the manure content increased in proportion to the dirt-to-manure ratio required to approximate topsoil. By way of example only, a formulation of 4 pounds topsoil, 8 pounds dirt, and 2 pounds manure would have a target dirt-to-manure ratio of 4. The substitute formulation without topsoil would therefore include 12 pounds dirt and one additional pound of manure for a total of 3 pounds manure to maintain the target dirt-to-manual ratio of 4. The organic composition without topsoil may include a variety of formulations whereby the constituents are present in the composition in the proportion of 60.9% to 71.8% dirt, 2.2% to 4.4% wood, 0.0% to 2.2% leaves, 8.9% to 17.4% manure, 8.6% to 10.2% sand, and 5.1% to 13.3% filtration waste. Weight fractions are relative to the total weight of the organic composition.

The wood chips constituent and leaves constituent are readily compostable materials and good sources of organic matter, organisms, nitrogen, and other nutrients beneficial to plant growth. The wood chips and leaves also increase the bulk or volume of the organic composition thereby allowing for aeration of the formulation and oxygenation of the composition. The weight fractions of wood chips and leaves depend in part on the quantity of nitrogen, organisms, and other nutrients required by the plant life supported by the organic composition. In some embodiments, it is possible for the wood chips to be replaced with an equal amount of leaves on a weight basis. In other embodiments, it is possible for the leaves to be replaced with an equal amount of wood chips on a weight basis. The substitution of wood chips for leaves or leaves for wood chips may also be on a non-weight basis whereby the substitution replicates a target value with respect to organic matter, organism load, nitrogen content, and/or other factor(s) beneficial to plant growth.

Some formulations may not include leaves and the proportion of wood chips may or may not be adjusted depending on the nitrogen content of the organic composition. The organic composition may include a variety of formulations.

The sand constituent generally improves the drainage characteristics of the organism composition by providing a source of matter which resists or is incapable of absorbing water. The sand may be useful in adjusting the pH level of the organic composition. Adjustability may depend on a variety of factors including, but not limited to, the rock type and composition from which the sand is made, the form of the sand (for example, whether the sand is a powder or granular), the starting pH of the organic composition, and the constituents of the organic composition. The weight fraction of sand depends in part on the absorption properties of the other constituents, the weather where the organic composition will be used, and the plant life supported by the organic composition.

The filtration waste is primarily composed of carbon, diatomaceous earth, and sugar. The respective ratios of carbon, diatomaceous earth, and sugar within the filtration waste are dependent on the variety of factors including, but not limited to, the following: the refinement process; the type and performance characteristics of the filters within the refinement system; the quantity, type and particle size of the carbon additive; the quantity, type and particle size of the sugar and adherence properties thereof; the thickness of the diatomaceous earth and/or carbon layers used within the filtration system; and the frequency at which the filter elements are cleaned. The filtration waste is generally moist when removed from the filtration system and may dry and harden over time. The filtration waste may be moistened and/or crushed prior to addition with other constituents comprising the organic composition. The filtration waste may include a variety of formulations. By way of example only, the filtration waste could include sugar, diatomaceous earth, and carbon whereby the ratio of diatomaceous earth to carbon is from 0.82 to 1.0 on a weight basis. In preferred embodiments, the filtration waste may have a total organic content as high as 85% by weight relative to the total weight of the filtration waste. However, the total organic content may be more or less depending on the final formulation of the organic composition and the plant life supported by the organic composition.

The carbon is added either in powder or particulate form to sugar during processing to decolorize the sugar in its final or nearly final form. In other refinement methods, the carbon could reside within the filter elements. The carbon within the waste is generally beneficial to plant growth. However, too much carbon could be detrimental as observed when bagasse is added to topsoil. In the present invention, the carbon may be balanced by the nitrogen originating from the topsoil, manure, wood chips, and/or leaves.

The diatomaceous earth is composed of the fossilized remains of one-celled plants referred to as diatoms. The diatomaceous earth may be a powder or particulates. Food-grade diatomaceous earth is preferred to minimize toxins or chemicals otherwise detrimental to plant growth and use. In the present invention, it is believed that the diatomaceous earth may act as a pesticide against a wide variety of garden pests including, but not limited to, aphids, beetle grubs, ants and squash bugs.

The sugar may include raw sugar, processed sugar, sugar constituents, carbohydrates, or the like trapped by and/or adhered to the filters within a filtration system during refining. It is likewise possible for the sugar to be trapped by and/or adhered to the carbon and/or diatomaceous earth. In some embodiments, the total weight of sugar will be less than that of the carbon and diatomaceous earth as the sugar passes through the filtration system. In the present invention, it is believed that the sugar may provide a readily available food source for organisms originating in the topsoil, manure, wood chips, and leaves. It is also believed that the sugar, if consumed, enables the organisms to reproduce at a higher rate than normal, thereby promoting the growth of the organism colony which otherwise resides within the organic composition and is capable of decomposing the wood chips, leaves, and/or manure.

While the filtration waste is preferred to be a byproduct from the filtration step during refinement of sugar, other non-refinement sources are possible for the filtration waste. In one non-limiting example, the filtration waste may be prepared by combining and mixing sugar, diatomaceous earth, and carbon in the desired weight fractions. The constituents may be separately purchased in powder or particulate form, placed in an industrial mixer, and blended until the constituents are evenly distributed throughout the mixture. In some embodiments, a liquid, one non-limiting example being water, may be added to the mixture prior to combination with other constituents comprising the organic composition. In other embodiments, it may be advantageous to dry the mixture prior to combination with other constituents comprising the organic composition.

It is understood that the weight fractions of the constituents comprising the filtration waste is application dependent and therefore could include an infinite number of formulations. The respective ratios of carbon, diatomaceous earth, and sugar within the filtration waste are dependent on the variety of factors including, but not limited to, the plant life exposed of the organic composition, environmental conditions, other constituents comprising and formulation of the organic composition, and organism load within the formulation and soil onto which the organic composition is applied. In preferred embodiments, the filtration waste includes carbon in the range from 19% to 32.7% by weight, diatomaceous earth in the range from 17.3% to 30% by weight, and sugar in the range from 40% to 62% by weight. One specific non-limiting example is carbon at 26.6% by weight, diatomaceous earth at 21.8% by weight, and sugar at 51.6% by weight. Weights are relative to the total weight of the filtration waste.

An organic composition is prepared by first thoroughly mixing the constituents in a barrel mixer until the constituents are evenly distributed throughout the composition and free of agglomerations. For example, at least one compostable material, namely, wood chips, leaves, and/or manure, and filtration waste may be placed into a barrel mixer in the proper proportions and spun until the constituents are evenly distributed throughout the mixture. In another example, dirt, at least one compostable material, sand, and filtration waste may be placed into a barrel mixer, with or without topsoil, in the proper proportions and spun until the constituents are evenly distributed throughout the mixture. Constituents may require drying or addition of water prior to mixing.

The organic composition is removed from the barrel mixer after mixing and then stored for aging. During aging, the compostable materials are decomposed naturally and by the organisms otherwise within the organic composition via the topsoil, manure, wood chips, and/or leaves. The organic composition may require aeration during aging to allow for a more uniform decomposition and to avoid hot spots which could otherwise kill organisms within the colony. The aging step is dependent on the formulation, environmental conditions, and desired characteristics of the organic composition. In preferred embodiments, the organic composition is aged for at least six months.

In addition to decomposition during aging, the organism colony may feed on the sugar otherwise present via the filtration waste. It is believed that the sugar may provide a food source which promotes or otherwise accelerates reproduction of organisms within the organism colony. Growth of the organism colony may reduce the total time required to properly age the composition.

In accordance with the description provided herein, specific examples are described below for illustrative purposes only and not intended to otherwise limit the scope and meaning of the invention. Weights are provided in pounds (lbs.) and representative of sample size. Weights are also provided as a percent (%) of the total sample weight which includes the weight of each constituent. Formulations are scalable consistent with the identified weight fractions.

Examples 1-4

TABLES 1-4 describe organic exemplary compositions including topsoil, dirt, manure, wood chips, leaves, sand, and filtration waste.

TABLE 1

| Constituent | Weight (lbs.) | Approximate Weight (%) |
|---|---|---|
| Topsoil | 7.0 | 33.3 |
| Dirt | 7.0 | 33.3 |
| Manure | 2.0 | 9.5 |
| Wood chips | 0.5 | 2.4 |
| Leaves | 0.5 | 2.4 |
| Sand | 2.0 | 9.6 |
| Filtration waste | 2.0 | 9.5 |

TABLE 2

| Constituent | Weight (lbs.) | Approximate Weight (%) |
|---|---|---|
| Topsoil | 7.0 | 32.5 |
| Dirt | 7.0 | 32.5 |
| Manure | 1.0 | 4.7 |
| Wood chips | 1.0 | 4.7 |
| Leaves | 0.5 | 2.3 |
| Sand | 2.0 | 9.3 |
| Filtration waste | 3.0 | 14.0 |

TABLE 3

| Constituent | Weight (lbs.) | Approximate Weight (%) |
|---|---|---|
| Topsoil | 7.0 | 37.3 |
| Dirt | 7.0 | 37.3 |
| Manure | 1.0 | 5.3 |
| Wood chips | 0.5 | 2.7 |
| Leaves | 0.25 | 1.3 |
| Sand | 2.0 | 10.8 |
| Filtration waste | 1.0 | 5.3 |

TABLE 4

| Constituent | Weight (lbs.) | Approximate Weight (%) |
|---|---|---|
| Topsoil | 7.0 | 33.0 |
| Dirt | 7.0 | 33.0 |
| Manure | 1.5 | 7.1 |
| Wood chips | 0.5 | 2.4 |
| Leaves | 0.1875 | 0.9 |
| Sand | 2.0 | 9.4 |
| Filtration waste | 3.0 | 14.2 |

Example 5

TABLE 5 describes an exemplary organic composition including topsoil, dirt, manure, wood chips, sand, and filtration waste.

TABLE 5

| Constituent | Weight (lbs.) | Approximate Weight (%) |
|---|---|---|
| Topsoil | 7.0 | 37.8 |
| Dirt | 7.0 | 37.8 |
| Manure | 1.0 | 5.4 |
| Wood chips | 0.5 | 2.7 |
| Leaves | 0.0 | 0.0 |
| Sand | 2.0 | 10.9 |
| Filtration waste | 1.0 | 5.4 |

Examples 6-9

TABLES 6-9 describe exemplary organic compositions including dirt, manure, wood chips, leaves, sand, and filtration waste.

TABLE 6

| Constituent | Weight (lbs.) | Approximate Weight (%) |
|---|---|---|
| Topsoil | 0.0 | 0.0 |
| Dirt | 14.0 | 60.9 |
| Manure | 4.0 | 17.4 |
| Wood chips | 0.5 | 2.2 |
| Leaves | 0.5 | 2.2 |
| Sand | 2.0 | 8.6 |
| Filtration waste | 2.0 | 8.7 |

TABLE 7

| Constituent | Weight (lbs.) | Approximate Weight (%) |
|---|---|---|
| Topsoil | 0.0 | 0.0 |
| Dirt | 14.0 | 62.2 |
| Manure | 2.0 | 8.9 |
| Wood chips | 1.0 | 4.4 |
| Leaves | 0.5 | 2.2 |
| Sand | 2.0 | 9.0 |
| Filtration waste | 3.0 | 13.3 |

TABLE 8

| Constituent | Weight (lbs.) | Approximate Weight (%) |
|---|---|---|
| Topsoil | 0.0 | 0.0 |
| Dirt | 14.0 | 70.9 |
| Manure | 2.0 | 10.1 |
| Wood chips | 0.5 | 2.5 |
| Leaves | 0.25 | 1.3 |
| Sand | 2.0 | 10.1 |
| Filtration waste | 1.0 | 5.1 |

TABLE 9

| Constituent | Weight (lbs.) | Approximate Weight (%) |
|---|---|---|
| Topsoil | 0.0 | 0.0 |
| Dirt | 14.0 | 61.7 |
| Manure | 3.0 | 13.2 |
| Wood chips | 0.5 | 2.2 |
| Leaves | 0.1875 | 0.8 |
| Sand | 2.0 | 8.9 |
| Filtration waste | 3.0 | 13.2 |

Example 10

TABLE 10 describes an exemplary organic composition including topsoil, dirt, manure, wood chips, sand, and filtration waste.

TABLE 10

| Constituent | Weight (lbs.) | Approximate Weight (%) |
|---|---|---|
| Topsoil | 0.0 | 0.0 |
| Dirt | 14.0 | 71.8 |
| Manure | 2.0 | 10.3 |
| Wood chips | 0.5 | 2.6 |
| Leaves | 0.0 | 0.0 |
| Sand | 2.0 | 10.2 |
| Filtration waste | 1.0 | 5.1 |

Example 11

TABLE 11 describes exemplary organic composition including wood chips, leaves, and filtration waste.

TABLE 11

| Constituent | Weight (lbs.) | Approximate Weight (%) |
|---|---|---|
| Topsoil | 0.0 | 0.0 |
| Dirt | 0.0 | 0.0 |
| Manure | 0.0 | 0.0 |
| Wood chips | 1.0 | 19.5 |
| Leaves | 0.125 | 2.5 |
| Sand | 0.0 | 0.0 |
| Filtration waste | 4.0 | 78.0 |

As is evident from the explanation herein, the described invention is a composition which promotes plant growth and health. Accordingly, the described invention is expected to be applicable as a material applied within an area at a thickness which allows new plant growth, as an additive onto the surface of an area to promote plate growth, or as a component for mixture with soil as a soil supplement to promote plant growth.

The description above indicates that a great degree of flexibility is offered in terms of the invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. An organic composition for use with plants comprising:
    (a) topsoil;
    (b) dirt;
    (c) wood chips;
    (d) leaves;
    (e) manure;
    (f) sand; and
    (g) a filtration waste which includes carbon, diatomaceous earth, and sugar, said sugar consumable by organisms within said organic composition.

2. The organic composition of claim 1, wherein said filtration waste is a waste byproduct of sugar refinement.

3. The organic composition of claim 1, wherein said filtration waste has a total organic content of at least 85% by weight relative to total weight of said filtration waste.

4. The organic composition of claim 1, wherein said organic composition has a total organic content in the range from 5% to 10% by weight relative to total weight of said organic composition.

5. The organic composition of claim 1, wherein said sugar promotes growth of an organism colony within said organic composition that decomposes said wood chips, said leaves, or said manure.

6. The organic composition of claim 1, wherein
    said topsoil is 37.3% by weight relative to total weight of said organic composition,
    said dirt is 37.3% by weight relative to total weight of said organic composition,
    said wood chips are 2.7% by weight relative to total weight of said organic composition,
    said leaves are 1.3% by weight relative to total weight of said organic composition,
    said manure is 5.3% by weight relative to total weight of said organic composition,
    said sand is 10.8% by weight relative to total weight of said organic composition, and
    said filtration waste is 5.3% by weight relative to total weight of said organic composition.

7. The organic composition of claim 1, wherein
    said carbon in the range from 19% to 32.7% by weight relative to total weight of said filtration waste,
    said diatomaceous earth in the range from 17.3% to 30% by weight relative to total weight of said filtration waste, and
    said sugar in the range from 40% to 62% by weight relative to total weight of said filtration waste.

8. An organic composition for use with plants comprising:
    (a) topsoil;
    (b) dirt;
    (c) wood chips;
    (d) manure;
    (e) sand; and
    (f) a filtration waste which includes carbon, diatomaceous earth, and sugar, said sugar consumable by organisms within said organic composition.

9. The organic composition of claim 8, wherein said filtration waste is a waste byproduct of sugar refinement.

10. The organic composition of claim 8, wherein
    said topsoil is 37.8% by weight relative to total weight of said organic composition,
    said dirt is 37.8% by weight relative to total weight of said organic composition,
    said wood chips are 2.7% by weight relative to total weight of said organic composition,
    said manure is 5.4% by weight relative to total weight of said organic composition,
    said sand is 10.9% by weight relative to total weight of said organic composition, and
    said filtration waste is 5.4% by weight relative to total weight of said organic composition.

11. The organic composition of claim 8, wherein
    said carbon in the range from 19% to 32.7% by weight relative to total weight of said filtration waste,
    said diatomaceous earth in the range from 17.3% to 30% by weight relative to total weight of said filtration waste, and
    said sugar in the range from 40% to 62% by weight relative to total weight of said filtration waste.

12. An organic composition for use with plants comprising:
    (a) dirt;
    (b) wood chips;
    (c) leaves;
    (d) manure;
    (e) sand; and
    (f) a filtration waste which includes carbon, diatomaceous earth, and sugar, said sugar consumable by organisms within said organic composition.

13. The organic composition of claim 12, wherein said filtration waste is a waste byproduct of sugar refinement.

14. An organic composition for use with plants comprising:
    (a) dirt;
    (b) wood chips;
    (c) manure;
    (d) sand; and
    (e) a filtration waste which includes carbon, diatomaceous earth, and sugar, said sugar consumable by organisms within said organic composition.

15. The organic composition of claim 14, wherein said filtration waste is a waste byproduct of sugar refinement.

16. The organic composition of claim 14, wherein
said dirt is 71.8% by weight relative to total weight of said organic composition,
said wood chips are 2.6% by weight relative to total weight of said organic composition,
said manure is 10.3% by weight relative to total weight of said organic composition,
said sand is 10.2% by weight relative to total weight of said organic composition, and
said filtration waste is 5.1% by weight relative to total weight of said organic composition.

17. The organic composition of claim 14, wherein
said carbon in the range from 19% to 32.7% by weight relative to total weight of said filtration waste,
said diatomaceous earth in the range from 17.3% to 30% by weight relative to total weight of said filtration waste, and
said sugar in the range from 40% to 62% by weight relative to total weight of said filtration waste.

18. An organic composition for use with plants comprising:
(a) wood chips;
(b) leaves;
(c) sand; and
(d) a filtration waste which includes carbon, diatomaceous earth, and sugar, said sugar consumable by organisms within said organic composition.

19. The organic composition of claim 18, wherein said filtration waste is a waste byproduct of sugar refinement.

20. The organic composition of claim 18, wherein
said carbon in the range from 19% to 32.7% by weight relative to total weight of said filtration waste,
said diatomaceous earth in the range from 17.3% to 30% by weight relative to total weight of said filtration waste, and
said sugar in the range from 40% to 62% by weight relative to total weight of said filtration waste.

21. An organic composition for use with plants comprising:
(a) topsoil;
(b) dirt;
(c) a compostable material including wood chips, leaves, or manure;
(d) sand; and
(e) a filtration waste which includes carbon, diatomaceous earth, and sugar, said sugar consumable by organisms within said organic composition.

22. The organic composition of claim 21, wherein said filtration waste is a waste byproduct of sugar refinement.

23. An organic composition for use with plants comprising:
(a) dirt;
(b) a compostable material including wood chips, leaves, or manure;
(c) sand; and
(d) a filtration waste which includes carbon, diatomaceous earth, and sugar, said sugar consumable by organisms within said organic composition.

24. The organic composition of claim 23, wherein said filtration waste is a waste byproduct of sugar refinement.

25. An organic composition for use with plants comprising:
(a) a compostable material including wood chips, leaves, or manure;
(b) sand; and
(c) a filtration waste which includes carbon, diatomaceous earth, and sugar, said sugar consumable by organisms within said organic composition.

26. The organic composition of claim 25, wherein said filtration waste is a waste byproduct of sugar refinement.

27. A method of producing an organic composition for use with plants comprising the steps of:
(a) removing a filtration waste from filtering equipment after refinement of sugar, said filtration waste being a waste byproduct of sugar refinement;
(b) mixing a compostable material and said filtration waste;
(c) promoting growth of an organism colony within said compostable material via said filtration waste; and
(d) aging said organic composition so that said organism colony decomposes said compostable material.

28. The method of claim 27, wherein said mixing step further includes dirt and sand.

29. The method of claim 27, wherein said mixing step further includes topsoil, dirt, and sand.

30. The method of claim 27, wherein said compostable material is wood chips.

31. The method of claim 27, wherein said compostable material is leaves.

32. The method of claim 27, wherein said compostable material is manure.

33. The method of claim 27, wherein said aging step is for at least six months.

34. The method of claim 27, wherein said filtration waste includes carbon, diatomaceous earth and sugar, and said organism colony consumes said sugar in said promoting step.

* * * * *